United States Patent [19]

Bupp et al.

[11] 4,059,484
[45] Nov. 22, 1977

[54] HYBRID NUCLEAR FUEL ASSEMBLY WITH REDUCED LINEAR HEAT GENERATION RATES

[75] Inventors: Lamar P. Bupp, Kirkland; George A. Sofer, Richland, both of Wash.

[73] Assignee: Exxon Nuclear Company, Inc., Bellevue, Wash.

[21] Appl. No.: 573,864

[22] Filed: May 2, 1975

[51] Int. Cl.² .................................................. G21C 3/30
[52] U.S. Cl. .................................... 176/78; 176/73; 176/94
[58] Field of Search ..................... 176/78, 77, 76, 75, 176/73, 94

[56] References Cited

U.S. PATENT DOCUMENTS

| | | | |
|---|---|---|---|
| 2,848,404 | 8/1958 | Teshow | 176/78 |
| 2,961,393 | 11/1960 | Monson | 176/78 |
| 3,049,487 | 8/1962 | Harrer | 176/78 |
| 3,147,191 | 9/1964 | Crowther | 176/78 |
| 3,179,571 | 4/1965 | Schabert | 176/78 |
| 3,206,369 | 9/1965 | Fortescue | 176/78 |
| 3,211,621 | 10/1965 | Creagan | 176/78 |
| 3,733,252 | 5/1973 | Georges | 176/78 |
| 3,745,069 | 7/1973 | Sofer | 176/78 |
| 3,791,466 | 2/1974 | Patterson | 176/78 |

FOREIGN PATENT DOCUMENTS 955,485  4/1964  United Kingdom .................. 176/78

OTHER PUBLICATIONS

Barth, "Power-Flattening Techniques Boost BWR Core Capabilities"; Nucleonics, May 1965, pp. 72-73.

*Primary Examiner*—Stephen C. Bentley
*Assistant Examiner*—Donald P. Walsh
*Attorney, Agent, or Firm*—F. Donald Paris; Ronald D. Hantman

[57] ABSTRACT

A hybrid fuel assembly for use in nuclear fuel reactors, such as a large pressurized water reactor, including a fuel assembly having a matrix of fuel rods of different sizes, wherein fuel rods of a first large size are disposed in island arrays which are located within the matrix of fuel rods of the second small size in the vicinity of the control rod guide tubes of the assembly, such that retention of the control rods normally associated with a reactor fuel assembly employing fuel rods only of the first size is possible while still allowing for the maximum linear heat generation rate (LHGR) for the larger first size rods to be reduced to the LHGR normal for the second smaller size fuel rods or lower.

10 Claims, 7 Drawing Figures

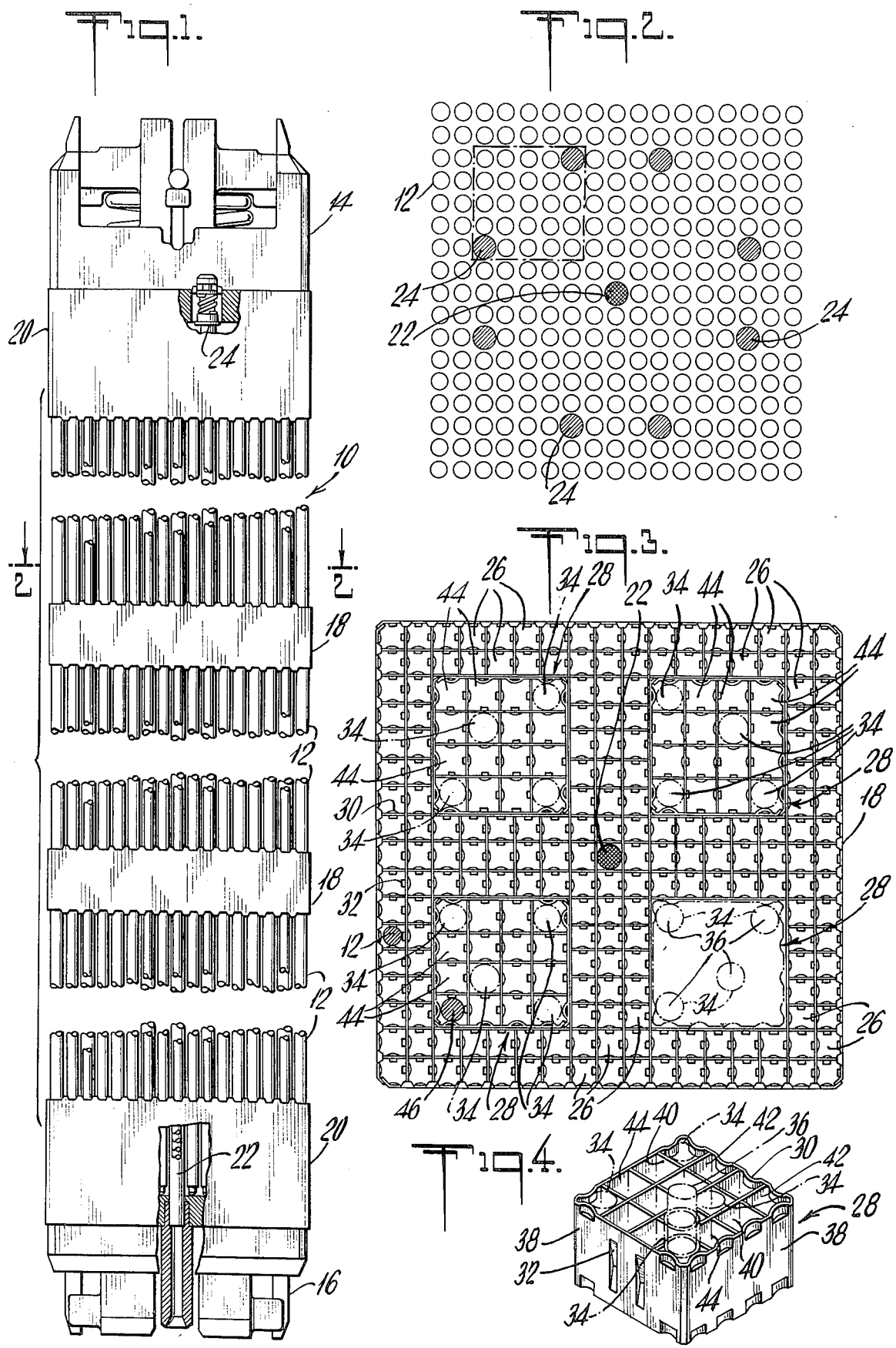

★ = MAX. PEAK IN LARGE ROD
★★ = MAX. PEAK IN SMALL ROD

★ = MAX. PEAK OCCURS IN THE LARGE ROD @ 1.110

HYBRID NUCLEAR FUEL ASSEMBLY WITH REDUCED LINEAR HEAT GENERATION RATES

BACKGROUND OF THE INVENTION

In an attempt to meet licensing requirements of the Nuclear Regulatory Commission, NRC, (formerly the U.S.A.E.C.), fuel designers have had to increase the number of rods per assembly, thereby reducing the LHGR (linear heat generation rates). Along with this change a small size fuel rod is required and a larger number of control rod guide tubes per assembly e.g., a switch from 15 × 15 to a 17 × 17 fuel array keeping the same external dimensions, with the number of control rod guide tubes increasing from 16 per assembly to 20 or 24. The number and location of control rod guide tubes in the lower LHGR design is not compatible with the number and location of the control rod guide tubes of the higher LHGR design now in use. This change in fuel assembly design would normally require a redesign and retrofitting of the control rod clusters as well as the control rod guides in the upper core structure which is separate from the control rods or the fuel, upon switching from the 15 × 15 design to the 17 × 17 design in an existing reactor. This retrofitting is costly and entails repair of a radioactive upper structure measuring approximately 15 ft. in diameter. Such repair must be performed at the reactor site and is expected to lead to reactor shutdown over periods of several weeks.

The subject invention is intended to enable continued use of existing control rods and control rod guide structures while reducing both maximum and average linear heat generation rates of a bundle as required by licensing criteria (10CFR50, Appendix K).

Prior art patents, specifically considered in connection with the present invention include the following U.S. Pat. Nos.: 2,848,404 — Treshow; 2,961,393 — Monson; 3,036,964 — Horning; 3,049,487 — Harrer et al; 3,060,111 — Sherman et al; 3,206,369 — Fortesque et al; 3,211,621 — Kreegan; 3,147,191 — Crowder; 3,733,252 — Georges et al and 3,745,069 — Sofer et al.

While these patents disclose the use of fuel rods of the same size containing different types of nuclear fuel, none disclose an arrangement wherein there is provided a hybrid fuel assembly having different size fuel rods, and more particularly wherein a basic fuel array with islands of fuel rod clusters is used.

SUMMARY OF THE INVENTION

In accordance with the present invention, there is provided a fuel assembly including island arrays of fuel rod clusters of a first large size disposed within a matrix of fuel having fuel rods of a second small size, in the vicinity of the control rod guide tubes of the fuel assembly. The islands replace a predetermined number of the smaller size fuel rods, which enables retention of the control rod geometry normally associated with a fuel rod array comprising fuel rods of the size of the rods situated in the islands. This arrangement reduces the linear fuel rod heat rate, which reduces the loss of coolant accident (LOCA) temperature to substantially below the maximum fuel rod cladding temperature 2200° F. (required NRC criteria) during LOCA. At this heat generation rate pellet melting along its centerline is avoided under those conditions where excessive power is generated by the assembly. The use of such a hybrid fuel assembly configuration has particular utility for reload fuel for the standard reactor wherein all fuel rods are of the same size and is particularly suitable for pressurized water reactor assemblies (e.g. the Babcock & Wilcox supplied power reactor at Oconee, N.C.) which normally contain about sixteen control rods per assembly. By using the reload arrangement which contains larger size fuel rods, it is possible to retain the control rod guide tube locations in the same position as they would be in a normal fuel assembly. The rod to rod pitch for the large size fuel rods and the actual size of these rods may have to be modified (i.e., increased) from those used in the uniform array, e.g. 15 × 15.

According to the present invention, the water coolant normally employed in the pressurized water reactor is distributed in the region of the control rods more uniformly when the hybrid fuel arrangement is used than in a fuel assembly having fuel rods of only one size (i.e., uniform) throughout including the region adjacent to the control rods, because the larger hydraulic diameters toward the center of the bundle tend to balance the flow channeling that takes place in the space between bundles. The present invention, when used together with an appropriate fuel enrichment distribution, enables a reduction of the maximum linear heat generation rate (LHGR), by approximately 20 to 25 percent, or in other words, reducing the maximum LHGR from 17.5 KW/ft. to about 12.5 KW/ft. for smaller rods and to 14 KW/ft. for larger rods.

The advantages, nature, construction and arrangement and operation of the present invention will be apparent upon consideration of the illustrated embodiments now to be described in detail in connection with the accompanying drawings.

BRIEF DESCRIPTION OF THE DRAWINGS

FIG. 1 is a longitudinal view in partial cross-section of a typical reload uniform nuclear fuel assembly having a 17 × 17 fuel rod array;

FIG. 2 is a cross-section of the uniform assembly taken substantially along the line 2—2 of FIG. 1;

FIG. 3 is a spacer assembly according to the present invention having a 17 × 17 fuel rod array with islands of 4 × 4 fuel rod clusters located in the vicinity of the control rod guide tubes;

FIG. 4 is an enlarged perspective view of one of the islands within the grid spaces of FIG. 3;

DESCRIPTION OF THE PREFERRED EMBODIMENTS

Figure 5:
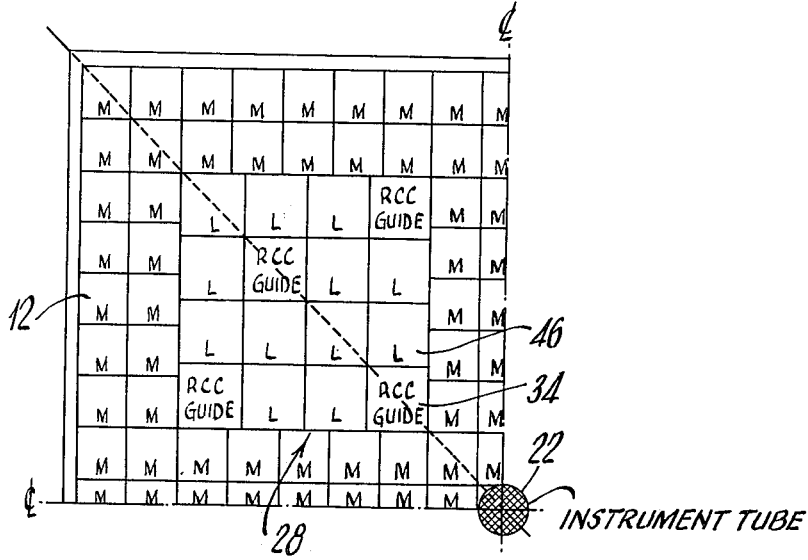
FIG. 5 illustrates a fuel enrichment distribution for a portion of the fuel assembly of FIG. 3.

Referring now to the drawings wherein like parts are designated by the same reference numeral throughout the several views, FIG. 1 illustrates an elevational view of a reload 17 × 17 fuel element assembly 10 for pressurized water reactor (PWR), of the type to be used in locations where there are no control rods, comprising a typical square transverse cross-section and provided with a plurality of nuclear fuel rods 12 arranged in parallel array, an upper tie plate 14, a lower tie plate 16, and fuel element spacer devices 18 and 20 which are disposed along the length of the fuel assembly for maintaining the fuel rods in fixed spaced relation, i.e. pitch, minimizing vibration and promoting flow mixing between fuel rods within individual assemblies and between adjacent assemblies. The fuel assembly includes the usual instrument tube 22 which provides in-core bottom access to the neutron detectors therein. Also provided are the usual control tubes 24 which are structural members which may provide receptables and guide surfaces for assembly control rods. The tubes differ in number depending on the particular fuel assembly design. FIG. 2 shows a transverse cross-section of the fuel assembly of FIG. 1, clearly illustrating the fuel arrangement utilized at core locations where there are no control rods.

Each fuel rod 12 comprises an elongated tube containing a fissile fuel material such as enriched uranium dioxide $UO_2$. The rods are supported in the usual manner at their lower end by the lower tie plate 16, and at their upper end, they are supported laterally only, by the top spacer adjacent to the upper tie plate. The control rod guide tubes serve as the structural skeleton for the fuel assembly and provide guidance for the control rod cluster which is inserted from above to control reactor power.

FIG. 3 illustrates the hybrid fuel assembly configuration of the present invention by showing a top view of the spacers. While the preferred embodiment is in a 17 × 17 fuel array with islands of 4 × 4 fuel rod island clusters wherein the latter fuel rods are positioned on the same pitch as in a 15 × 15 fuel assembly, the invention also is applicable to and has utility with other nuclear reactor fuel designs such as 16 × 16 fuel assemblies as will be apparent from the following description. The spacer device 18 essentially comprises intersecting grids on support strips which form an egg-crate with openings 26 through which the fuel rods 12 pass. As shown located symmetrically about the intersecting diagonals and with respect to each diagonal per se and in each quadrant of the assembly, there are provided four islands 28. Each island may be identical in construction and employ the same nuclear fuel rod design (i.e., size and pitch) that would be employed for a standard 15 × 15 fuel array or the size and pitch can be suitably modified from that normally used in a standard 15 × 15 array for use in the island area. By locating these islands within the matrix of 17 × 17 fuel, retention of the control rods normally employed in a 15 × 15 fuel is enabled, while the maximum LHGR typical of the 17 × 17 fuel is achieved. Thus, as illustrated in FIG. 3, there are 188 fuel rods having a 0.380 inch diameter whereas normally there would be 280 such fuel rods in the 17 × 17 fuel array. Each of the fuel rods is held in place by dimples 30 and springs 32 which extend inwardly into each of the nuclear fuel rod openings formed in each spacer. The normal 17 × 17 array has been replaced by 16 guide tubes 34 and a corresponding number of control rods 36, all of which are disposed within each of the islands 28 as discussed in detail hereinafter. The dotted lines in FIG. 2 illustrate those portions of the 17 × 17 array which have been removed and replaced by the islands 28 in accordance with the present invention. As illustrated in FIG. 2, 25 locations or openings 26 have been replaced by each island. An island 28 essentially comprises a module having sides 38 and intersecting strips 40 and 42, which form an egg-crate having naturally larger openings 44 for receiving the respective fuel rods and guide tubes. These openings accommodate larger size fuel rods 46, making forty-eight in number in the assembly (each has 12 rods), of 0.470 inch diameter. The rods 12 and 46 contain different fuel enrichments in order to lower power production in the large size rods, thereby maintaining their LHGR reasonably close to that of the small size rods. Each module is structurally similar in all respects to the grid spacer of the 17 × 17 fuel array for purposes of maintaining the fuel rods and guide tubes in place. Each module 28 includes four guide tubes 34 having a corresponding control rod 36, which replace two guide tubes and control rods of the 17 × 17 fuel assembly shown in FIG. 2. It should be understood that FIG. 2 does not illustrate a typical 17 × 17 assembly. A normal 17 × 17 assembly has 20 or 24 guide tubes to accommodate the control rods appropriate for 17 × 17 arrays. FIG. 2 employs a minimum number of guide tubes (eight) to satisfy structural requirements only. The guide tube and control rod arrangement in each island may be the same as that for a 15 × 15 fuel array or suitably modified for the particular fuel design. By so constructing a 17 × 17 fuel array with islands of fuel rod clusters, compatability is retained with control rod clusters which were designed for insertion into the 15 × 15 assemblies. By using a hybrid assembly in accord with the teachings of the present invention, in a PWR the water content is distributed in the region of the control rods more uniformly because the larger hydraulic diameter in the four 4 × 4 islands balances the flow channelling which occurs between assemblies. The hybrid assembly when associated with an appropriate enrichment distribution, enables reduction of the maximum LHGR by about 20 to 25 percent, which means a reduction of from about 17½ KW/ft. to 13–14 KW/ft.

A typical enrichment distribution that would satisfy the above is where one-half of those reload assemblies which replace the original fuel assemblies, FIG. 2 (Type A assemblies) have an assembly average enrichment of approximately 0.3% higher than the normal reload enrichment, while the other half of the reload assemblies have an assembly average enrichment of approximately 0.3% lower than the normal reload enrichment (Type B assemblies, FIG. 3). This permits further reductions in relative assembly power peaking in the core. The lower enrichment reload assemblies are provided in the regions of normally higher power (i.e. away from core periphery and locations adjacent to fuel with relatively high reactivity so that a flatter power distribution is achieved, thereby reducing the peak assembly heat generation rate). The reduction of island fuel rod enrichment enables dropping the power in the island rods so that the desired low LHGR is obtained. With such an enrichment distribution the local power peaking in the hybrid assembly will be higher than that in a uniform 15 × 15 or 17 × 17 or other uniform rod fuel assembly. However, the peak power in the hybrid assembly still occurs in the portion of the fuel assembly externally of and at the periphery of the islands, which results in an acceptably low LHGR.

The following tables are illustrative of some typical mechanical design characteristics and enrichments for a hybrid assembly in accordance with the present invention in a PWR. It should be recognized, however, that the present invention is applicable to types of power reactors where 16 control rods are used as in a 15 × 15 fuel assembly as well as in other fuel assemblies, for example, a 14 × 14 fuel array, 16 × 16 and 18 × 18 fuel arrays.

TABLE I

| | Uniform* Fuel Assembly | Hybrid Fuel Assembly (For Control Rod Locations) |
| --- | --- | --- |

TABLE I-continued

| Mechanical | Type A | Type B |
|---|---|---|
| No. Small Fuel Rods/Assembly | 280 | 188 |
| No. Large Fuel Rods/Assembly | None | 48 |
| No. Guide Tubes/Assembly | 8 | 16 |
| No. Instrument Tubes/Assembly | 1 | 1 |
| Cladding Material | Zirc-4 | Zirc-4 |
| Cladding O.D., in. | 0.380 | 0.380 & 0.470 |
| Cladding Thickness, inc. | 0.024 | 0.024 & 0.030 |
| Active Length, inc. | 144 | 144 |
| Total Fuel Rod Length, inc. | 165.625 | 165.625 |
| $UO_2$ Per Assembly, lb. | 1233 | 1076 |

| Average Linear Power Densities (KW/ft.) | | | |
|---|---|---|---|
| | Type A | Type B | |
| | 17 × 17 | Small Rods | Large Rods |
| Thermal-Hydraulic (overall reactor) | | | |
| Average LHGR, KW/ft. | 4.60 | 5.22 | 5.60 |
| Maximum LHGR, KW/ft. | 12.23 | 12.23 | 14.00 |
| Nuclear | | | |
| Total nuclear peaking factor | 2.57 | 2.26 | 2.42 |
| Total heat flux peaking factor | 2.66 | 2.34 | 2.50 |
| Average Reload Enrichment | | | |
| Enrichment wgt. % $U^{235}$ | 3.22 | 2.88 | 1.75 |
| | | 2.65 avg. | |
| Average Reload Enrichment | 2.94 | | |

*To be kept away from control rod positions at all times.

FIG. 5 shows the fuel enrichment distribution in transverse cross-section of one quadrant of a fuel assembly in accordance with the present invention. The remainder of the assembly would have symmetrical fuel enrichment with respect to the centerlines of the assembly. Thus, in the 17 × 17 assembly with 4 × 4 islands which have fuel rods 12 and 46, respectively having different fuel compositions and different sizes, the smaller size rods 12 are located externally of the islands and at the periphery of each assembly are designated M and comprise high enrichment uranium oxide containing 2.88% by weight U-235 and having an outside diameter of 0.380 inches. On the other hand, the rods in the islands 28 are designated L and contain low enrichment uranium oxide containing 1.75% by weight U-235 and have an outside diameter of 0.470 inches which avoids excessive flow area in that region. The four locations within each island designated RCC actually comprise the guide tube 34 and control rods 36. FIG. 5 provides the nuclear beginning of life characteristics of the fuel by illustration of the enrichment distribution for the hybrid fuel assembly containing fuel rods of two different diameters. This is by comparison to the uniform enrichment distribution which normally would be found in the 17 × 17 fuel assembly having uniform size rods throughout.

Figure 6:
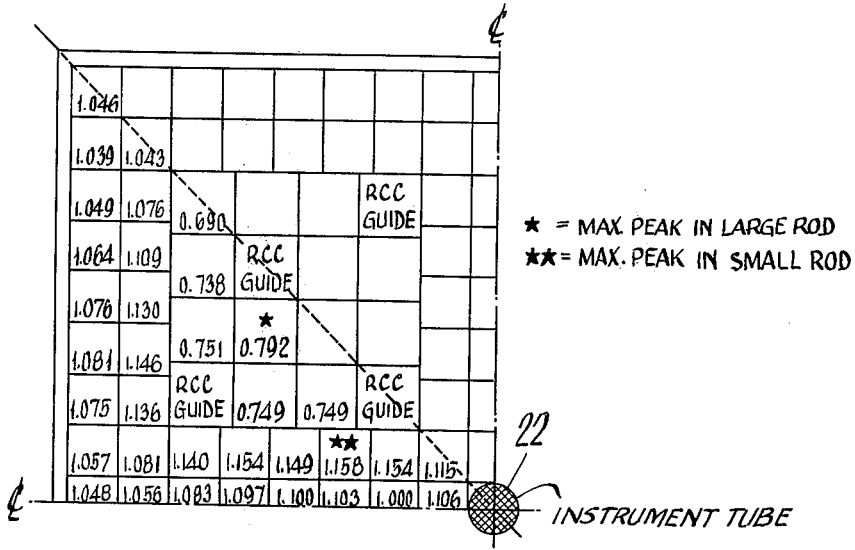
FIG. 6 illustrates the relative power density distribution of a portion of the fuel assembly of FIG. 3.

FIG. 6 illustrates the relative volumetric power distribution for a quadrant of a hybrid fuel assembly in accordance with the present invention. In the hybrid arrangement the large size rods (in the islands) produce about 21.45% of the power while the small size rods produce 78.54%. As shown, maximum power peaking in the assembly occurs outside the island and the minimum power peaking is in the islands.

Figure 7:
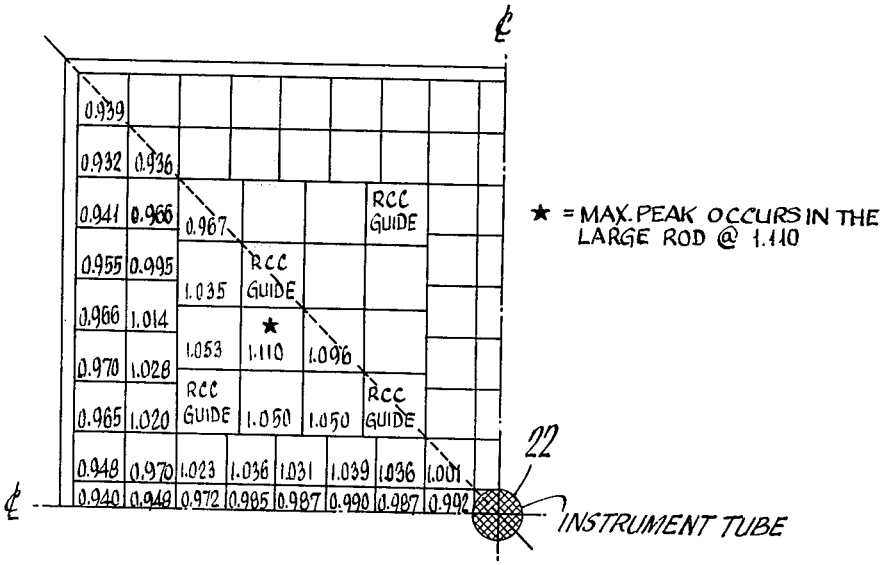
FIG. 7 illustrates the local relative linear heat rates for the fuel assembly of FIG. 3.

FIG. 7 illustrates the local relative linear heat rate for a quadrant of a hybrid fuel assembly in accordance with the present invention. To determine absolute linear heat rate, the local relative linear heat generation rate given in FIG. 7 is multiplied by the average linear heat generation rate for the bundle. This illustration is prepared in accordance with standard practice in the art from FIG. 6 which provides the local peaking component used in determining maximum linear heat rate. One can easily determine the relative linear heat rate indicated in each of the block spaces which corresponds to the fuel rods 12 and 46 in the fuel assembly of FIG. 3.

The hybrid fuel assembly incorporation of islands of fuel rod clusters provides a relatively unique flow distribution advantage.

Thus, while there has been described heretofore and illustrated herewith a preferred embodiment of the present invention including various modifications and variations thereof, still further modifications and variations thereof will be obvious to those skilled in the art once they have been made aware of the present disclosure. For example, the invention may have utility with other types of fuel design and arrangements. Accordingly, reference should be made to the following appended claims to determine the true scope and spirit of the subject invention.

What is claimed is:

1. A hybrid fuel assembly to reduce the maximum and average linear heat generation rates for use in a nuclear reactor having a plurality of control rods comprising a plurality of elongated fuel rods disposed in spaced parallel array, said fuel rods including a first plurality of said fuel rods having a first diameter and a second plurality of said fuel rods having a second diameter greater than said first diameter, said first plurality of fuel rods includes a first fuel enrichment and said second plurality of fuel rods includes a second fuel enrichment different from said first fuel enrichment, said second plurality of fuel rods being divided into clusters of fuel rods forming islands, said islands including guide tubes having diameters substantially the same as said second plurality of fuel rods, one guide tube corresponding to each of said control rods, said islands located within said assembly so that said guide tubes may receive all of said control rods, said islands being symmetrically located relative to the intersecting diagonal centerlines of said fuel assembly.

2. The hybrid fuel assembly of claim 1 wherein said first plurality of fuel rods are located about the periphery of said fuel assembly.

3. The hybrid fuel assembly of claim 1 wherein said second plurality of fuel rods are located internally of said fuel assembly.

4. The hybrid fuel assembly of claim 1, wherein said second plurality of fuel rods are located internally of said fuel assembly in clusters of fuel rods each of which comprises an island wherein said fuel rods have a pitch different from that of said first plurality of fuel rods.

5. The hybrid fuel assembly of claim 4 wherein said fuel assembly comprises four of said islands, each of said islands being symmetrically located relative to the intersecting diagonal centerlines of said fuel assembly.

6. The hybrid fuel assembly of claim 1 wherein said fuel assembly comprises a plurality of islands symmetrically located about the intersecting diagonal centerlines of said fuel assembly, each of said islands comprising said second plurality of fuel rods, said first plurality of fuel rods having a first pitch corresponding to that for said fuel assembly and said second plurality of fuel rods having a second pitch different from said first pitch.

7. The hybrid fuel assembly of claim 1 wherein said fuel assembly includes a plurality of islands comprising a predetermined number of said second plurality of fuel rods, and each of said islands replacing a predetermined number of said first plurality of fuel rods which is greater than the number of fuel rods of said second plurality contained in each of said islands.

8. The hybrid fuel assembly of claim 1 wherein said fuel assembly comprises a plurality of islands of said second plurality of fuel rods, said second plurality of fuel rods having a larger diameter than that of said first plurality of fuel rods, said fuel assembly having maximum power peaking based on volumetric heat generation rate in the ones of said first plurality of fuel rods surrounding each of said islands.

9. The hybrid fuel assembly of claim 1 wherein said second plurality of fuel rods has a diameter greater than that of said first plurality of fuel rods.

10. The hybrid fuel assembly of claim 1 wherein said fuel assembly comprises a plurality of modules wherein each of said modules comprises an island having said second plurality of fuel rods maintained at a pitch different from that of said first plurality of fuel rods, each of said islands being located in the vicinity of said control means for said first plurality of fuel rods, thereby reducing the linear heat generation rates of said second plurality of fuel rods to that normally associated with said first plurality of fuel rods.

* * * * *